May 15, 1923.

J. P. SIMMONS 1,455,176

VALVE GRINDING MACHINE

Filed June 29, 1921      2 Sheets-Sheet 1

INVENTOR.
JOHN P. SIMMONS.
BY Chas. E. Townsend
ATTORNEY

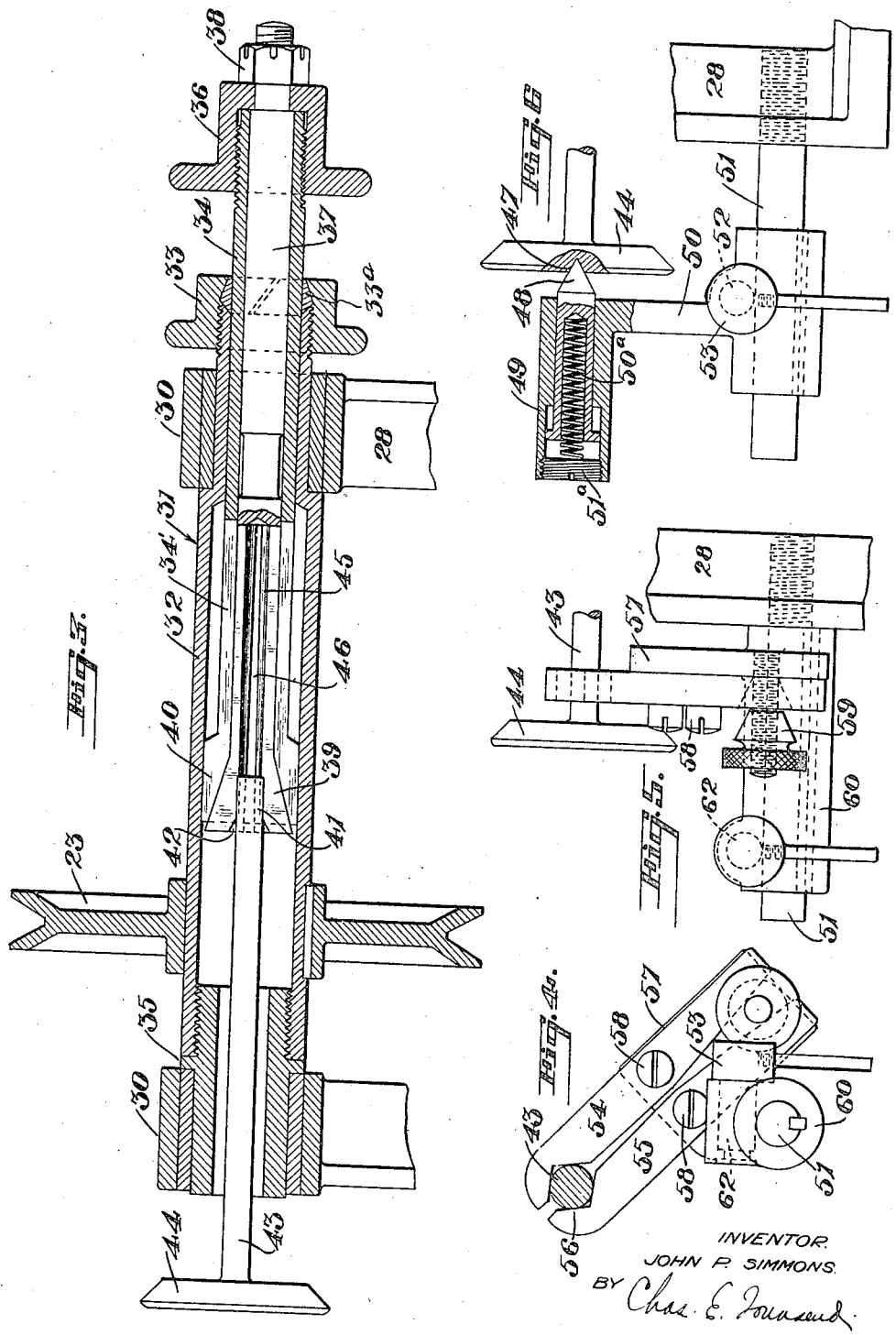

Patented May 15, 1923.

1,455,176

UNITED STATES PATENT OFFICE.

JOHN P. SIMMONS, OF SAN FRANCISCO, CALIFORNIA.

VALVE-GRINDING MACHINE.

Application filed June 29, 1921. Serial No. 481,236.

*To all whom it may concern:*

Be it known that I, JOHN P. SIMMONS, a citizen of the United States, residing at the city and county of San Francisco, and State of California, have invented new and useful Improvements in Valve-Grinding Machines, of which the following is a specification.

This invention relates to a machine tool and particularly pertains to a valve grinding machine for use in connection with engine poppet valves.

It is the principal object of the present invention to provide a machine tool adapted to grip poppet valves of various dimensions and to present them to a grinding member where they may be properly dressed as required, and their faces accurately and smoothly ground. All of these operations may be brought about by simple and easily controlled mechanism.

The present invention contemplates the use of a bedplate carrying a head stock by which the stems of poppet valves may be gripped and presented to a grinding member supported upon the bedplate.

The invention is illustrated by way of example in the accompanying drawings in which;

Fig. 3 is an enlarged view in central longitudinal section through the head stock and the chuck.

Fig. 4 is an enlarged view in elevation showing the valve stem centering means.

Fig. 5 is a view in side elevation showing the parts disclosed in Fig. 4.

Fig. 6 is a view in section and elevation showing the use of a center pin in connection with the valve.

Figure 1:
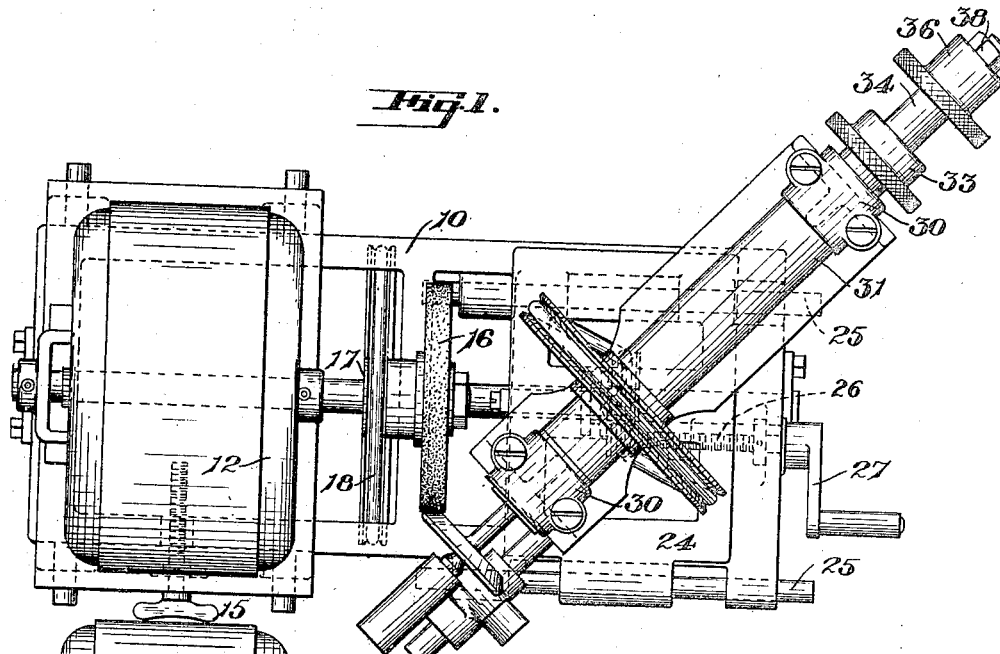
Figure 1 is a view in plan showing the completely assembled machine with which the present invention is concerned.

Referring more particularly to the drawing—10 indicates a bedplate which is supported upon standards 11. This bedplate is provided as a base for a driving motor 12 and a grinding head 13. The driving motor is mounted upon a carriage 14 which moves transversely of the bedplate and may be adjustably set by screws 15 more clearly shown in Fig. 1. The armature shaft of the motor projects toward the grinding head and carries a grinding wheel 16 and a pulley 17. A belt 18 is led around the pulley 17 and also around a large driving pulley 19 carried by a countershaft 20. The countershaft extends horizontally beneath the bedplate and is rotatively supported in suitable bearings forming a part of the supporting standards 11. A sliding pulley 21 is splined onto the shaft 20 and drives a belt 22 leading around the driving pulley 23 of the grinding head 13.

The grinding head comprises a carriage 24 adapted to move longitudinally of the bedplate and is guided by rods 25. The movement of this head is brought about by a feed screw 26 carrying an operating crank 27. Pivotally supported upon carriage 24 for movement in a horizontal plane is a head stock 28 which is secured in position by a pivot bolt 29. This head stock is formed with two spaced uprights carrying bearings 30 in which a spindle 31 is rotatively supported.

The details of construction of the chuck spindle are more clearly shown in Fig. 3 where it will be seen that an outer tubular mandril 32 is provided. The rear end of this mandril is reduced in diameter at the point where it extends through the rear bearing 30. This reduced portion projects a distance from the face of the bearing 30 and is threaded to receive a clamping nut 33. The threaded end of the mandril is counterbored to accommodate the tapered face of a split wedge ring 33ª. This ring is also formed with a second tapered face which is engaged by the tapered bore of the clamping nut 33. It is obvious that when the nut 33 is drawn up on the mandril, the split ring will be contracted and grip the inner tubular chuck member 34 and clamp the mandril thereto. The forward end of the mandril 32 does not extend through the forward bearing 30 but is internally threaded to receive an extension 35 which projects through the bearing and is formed with a collar against which the forward end of the mandril abuts. The pulley 23 is keyed to the mandril at a point near its forward bearing. The tubular chuck element 34 extends substantially midway the length of the mandril and projects from the rear end thereof. The portion of the element terminating within the mandril is formed with a large cylindrical head substantially agreeing in outer diameter with the inner diameter of the mandril. This end of the element 34 is longitudinally slotted at points around its circumference as indicated at 34'. While the major portion of the element is of reduced diameter and fits within the reduced portion of the mandril 32 an adjusting nut 36 is threaded onto the rear end of the tubular chuck member 34. This chuck member telescopes over a chuck spindle 37 which spindle fits snugly within the member 34 and is formed at its rear end with a shoulder abutting against the end face of the adjusting nut 36. The reduced portion of the spindle extends through an opening in the nut and receives a lock nut 38. The forward end of the chuck spindle is outwardly tapered to form an enlarged frusto-conical jaw section 39 having an outer tapered wall agreeing with the tapered face of the enlarged end 40 of the tubular member 34. A cylindrical bore 41 is formed longitudinally of the end of the jaw section 39, said portion being counterbored as indicated at 42 to facilitate the insertion of the stem 43 of a valve 44. A bore 45 of reduced diameter extends longitudinally of the chuck spindle 37 for a considerable distance. The side walls of the spindle are slotted as indicated at 46 to permit the chuck jaws to suitably yield and grip the end of the stem, while holding it in the position shown in Fig. 3.

In some instances the end faces of the valve members 44 are formed with a centering hole 47 as indicated in Fig. 6. Under this condition a centering pin 48 may be seated within the hole to hold the valve in proper position for operation. Pin 48 is slidably supported within a sleeve 49 and is yieldably held by a spring 50$^a$ acting against the pin and a lock nut 51$^a$. Sleeve 49 is carried by an arm 50 which arm is formed with a boss through which extends a supporting shaft 51 carried by the headstock 28. The structure may be located in any desired position by rotation of an eccentric member 52 by a knob 53. When the valve is not formed with a centering hole it is necessary to center the valve from its stem. This is done by the structure shown in Figs. 4 and 5. This centering device comprises a pair of pivoted arms 54 and 55 which have complementary V shaped grooves 56 at adjacent outer ends. These grooves form a seat for valve stem 43, as clearly shown in Fig. 4. The pivoted arms are supported from a bracket 57 by pivot pins 58, while their opposite ends are acted upon by a conical expanding nut 59 which tends to force these ends of the arms apart and to force the opposite ends inwardly against the opposite sides of the stem. The bracket 57 is carried upon a hub 60 which is splined to the shaft 51. An eccentric 62 is provided to lock the bracket and its hub in a desired position.

Figure 2:
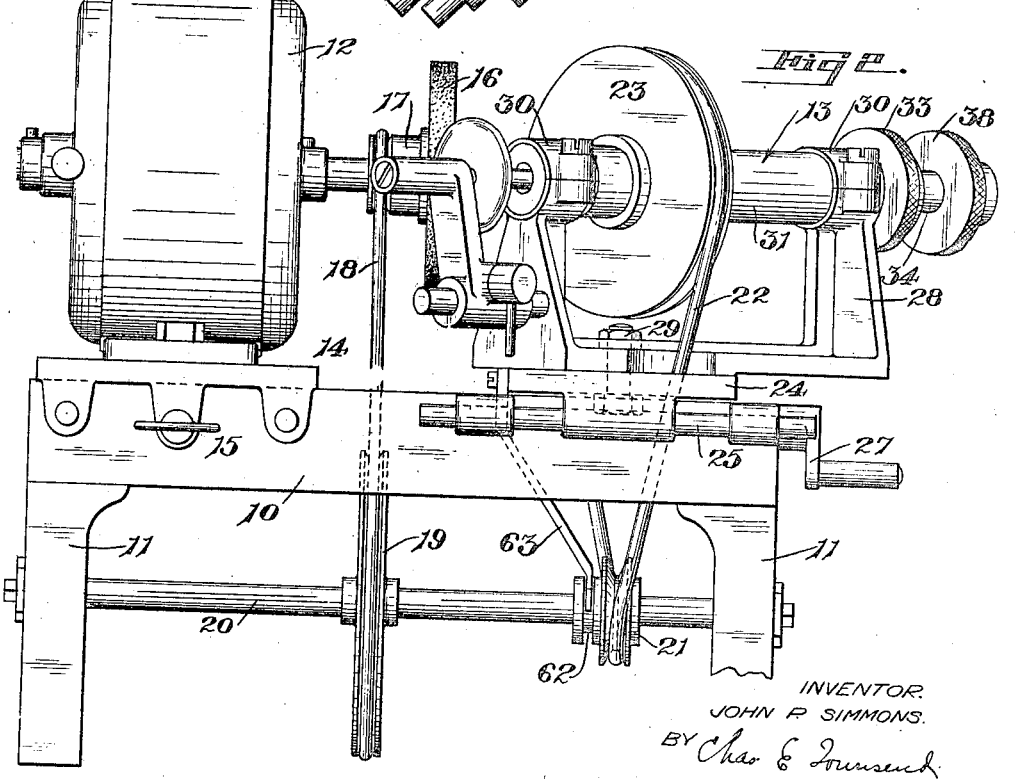
Fig. 2 is a view in side elevation showing the machine disclosed in Fig. 1.

In the operation of the present invention the stem 43 of a poppet valve 44 is inserted through the central opening of the mandril sleeve 35. The end of this stem will then find its way into the bore 41 of the chuck head 39. The length of stem projecting into the mandril may be regulated by loosening the nut 33 advancing or retracting the chuck member 34 and thereafter tightening the same to cause the end of the mandril 32 to grip the tubular chuck member 34. The stem may then be fastened in position by rotation of the nut 36 on the rear end of the member 34. This rotation will cause the tapered chuck head 39 to be drawn into the cup 40 at the end of the chuck member 34. Attention is directed to the fact that this member is split longitudinally as indicated at 34'. Thus the tapered faces of the members 39 and 40 will produce a wedging action first to expand the member 40 against the mandril and then to contract the member 39 around the end of the valve stem. At the time this action is produced it is desirable to hold the valve in the properly centered position. If a centering hole is formed in the face of the valve, as shown in Fig. 6, the center pin 48 may be seated within this hole thus tending to center and hold the valve member in a properly aligned position while permitting it to rotate. If there is no centering hole in the valve the center pin support 50 may be removed from the shaft 51 and the structure shown in Figs. 4 and 5 substituted therefor. The members 54 and 55 will then be held on opposite sides of the valve stem in a properly adjusted position by the cone 59. The head stock may be disposed at a desired angle by setting the pivot bolt 29 after which the entire carriage and head stock may be moved longitudinally of the table by operation of the crank 27. Adjustment of the grinding wheel 16 may also be brought about if desired to dispose the bevelled face of the valve in proper register with the grinding face of the wheel 16. The motor may then be started and its action will drive the wheel 16 as well as the pulley 17. The pulley 17 will act through its belt 18 to drive the countershaft 20, which rotation will be imparted through the belt 22 to the pulley 23 on the mandril 32. As shown in Fig. 2 a shifting collar 62 is formed as part of the hub of pulley 21. This collar receives a shifting yoke 63 carried by the carriage 24, thus causing the pulley 21 to move in unison with the carriage as it travels back and forth along the bedplate.

It will thus be seen that by the arrangement here disclosed a compact machine tool is provided adapted to readily receive poppet valves and present them to a suitable grinding member, at the same time providing means for simultaneously driving the grinding member and the valve.

While I have shown the preferred form of my invention it will be understood that various changes may be made in the combination, construction, and arrangement of parts by those skilled in the art without departing from the spirit of the invention as claimed.

Having thus described my invention what I claim and desire to secure by Letters Patent is:

1. In a valve grinding machine a head stock having a tubular rotating mandril, a chuck structure incorporated within said mandril for receiving the end of a valve stem, means for adjusting the chuck relatively to the mandril to accommodate valve stems of varying lengths, and means for clamping the chuck onto the stem to thereafter be rotated by the mandril.

2. In a valve grinding machine a head stock, a tubular mandril rotatively supported thereby, a chuck structure enclosed within said mandril and adapted to receive the end of a poppet valve stem, means for locking the said structure relatively to the mandril whereby valve stems of various lengths may be accommodated, and means for simultaneously locking the chuck structure to the mandril and clamping it around the valve stem.

3. In a valve grinding machine, a head stock having a mandril, a tubular chuck member mounted therein, a chuck spindle mounted in the tubular chuck member, said spindle being formed with a contractible opening in one end for the reception of a valve stem, means for adjusting the chuck member and spindle relatively to the mandril whereby valve stems of various lengths may be accommodated, means for clamping said chuck member to the mandril to be rotated therewith, and means for simultaneously clamping the valve stem within the end of the chuck spindle and clamping said spindle to said tubular chuck member.

4. In a valve grinding machine, a head stock, a tubular mandril rotatable therein, a tubular chuck member mounted within the mandril, and adjustable longitudinally thereof, and turnable therewith, an enlarged split head formed on one end of said chuck member, said head having a tapered opening, a chuck spindle having a split end recessed for the reception of a valve stem, said spindle having a tapered head conforming to the opening in the chuck member whereby relative movement of the spindle and the chuck member in one direction will contract the recess in the spindle, and means for simultaneously clamping the valve stem within the recess in the spindle and locking said spindle to said tubular chuck member.

5. In a valve grinding machine, a head stock, a tubular mandril rotatable therein, said mandril having a reduced portion, a tubular chuck member supported within the mandril by said reduced portion, an enlarged split head formed on said chuck member within the mandril, said chuck head having a tapered opening formed as a continuation of a central bore in the chuck member, means permitting longitudinal adjustment of the tubular chuck member longitudinally of the mandril, and means for clamping the chuck member relatively to the mandril, a chuck spindle bored and split at one end for the reception of a valve stem, a tapered head on said spindle conforming to the tapered opening in the tubular chuck member, said spindle adapted to snugly fit within the bore of said member, the tapered head in engagement with said tapered opening whereby longitudinal movement in one direction of the spindle relatively to the tubular member will contract the bore in said spindle to center and clamp the valve stem, and means for longitudinally adjusting said spindle relatively to said tubular member, whereby the bore for the reception of the valve stem will be expanded or contracted.

JOHN P. SIMMONS.